US012619365B2

(12) United States Patent
Jo

(10) Patent No.: US 12,619,365 B2
(45) Date of Patent: May 5, 2026

(54) MEMORY CONTROLLER CONTROLLING POWER CONSUMPTION, MEMORY SYSTEM INCLUDING THE SAME, AND METHOD OF OPERATING MEMORY CONTROLLER

(71) Applicant: Samsung Electronics Co., Ltd., Suwon-si (KR)

(72) Inventor: Taegwang Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/801,953

(22) Filed: Aug. 13, 2024

(65) Prior Publication Data

US 2025/0139001 A1 May 1, 2025

(30) Foreign Application Priority Data

Oct. 25, 2023 (KR) ........................ 10-2023-0144181
Jan. 8, 2024 (KR) ........................ 10-2024-0003117

(51) Int. Cl.
G06F 3/06 (2006.01)

(52) U.S. Cl.
CPC .......... G06F 3/0625 (2013.01); G06F 3/0653 (2013.01); G06F 3/0679 (2013.01)

(58) Field of Classification Search
CPC ...... G06F 3/0625; G06F 3/064; G06F 3/0653; G06F 3/0655; G06F 3/0658; G06F 3/0679; G06F 2212/1028
See application file for complete search history.

(56) References Cited

U.S. PATENT DOCUMENTS

| | | | |
|---|---|---|---|
| 8,671,260 B2 | 3/2014 | Abe et al. | |
| 9,195,293 B1 | 11/2015 | Quillen et al. | |
| 9,317,212 B2 | 4/2016 | Huffman et al. | |
| 9,904,478 B2 | 2/2018 | Roh | |
| 10,120,817 B2 | 11/2018 | Margetts et al. | |
| 10,871,916 B2 | 12/2020 | Shin | |
| 11,175,852 B2 | 11/2021 | Jung et al. | |
| 11,435,903 B2 | 9/2022 | Yang et al. | |
| 2016/0116968 A1* | 4/2016 | Thangaraj | G06F 1/3268 |
| | | | 713/320 |
| 2017/0206007 A1* | 7/2017 | Shin | G06F 3/061 |
| 2018/0059977 A1* | 3/2018 | Matsuyama | G06F 3/0659 |
| 2019/0332311 A1* | 10/2019 | Shin | G11C 16/32 |
| 2022/0300185 A1* | 9/2022 | Amaki | G06F 3/0652 |
| 2022/0404976 A1* | 12/2022 | Bi | G06F 3/0616 |

* cited by examiner

*Primary Examiner* — Tracy A Warren
(74) *Attorney, Agent, or Firm* — Fish & Richardson P.C.

(57) ABSTRACT

Provided are a memory controller controlling power consumption, a memory system including the memory controller, and a method of operating the memory controller. The memory controller includes a write amplification factor (WAF) calculator configured to calculate a WAF value relating to a ratio of an amount of data written to the memory device to an amount of write data provided from the host, a performance controller configured to adjust performance of the write operation such that the performance of the write operation decreases, compared to a certain reference performance value, as the calculated WAF value increases, the performance controller configured to thereby control the memory device to consume power within a power range, and a command processor configured to control execution of write commands for performing the write operation, based on control by the performance controller.

19 Claims, 18 Drawing Sheets

Figure 2:
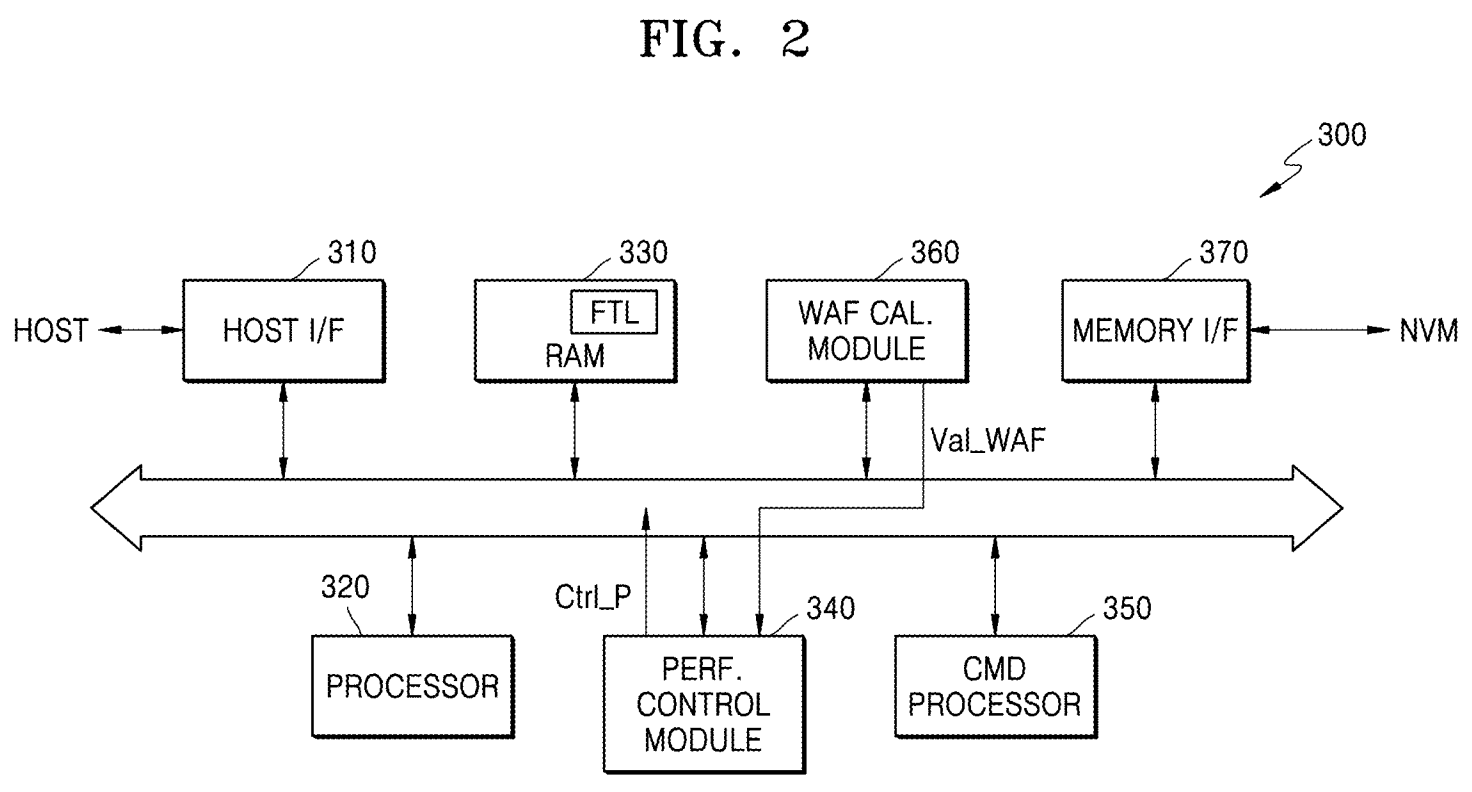

HOST I/F 310

RAM 330
FTL

WAF CAL. MODULE 360

MEMORY I/F 370

NVM

Val_WAF

HOST

PROCESSOR 320

PERF. CONTROL MODULE 340

CMD PROCESSOR 350

Ctrl_P

EXECUTE WRITE COMMAND ACCORDING TO WRITE BANDWIDTH BASED ON FIRST PERFORMANCE —S21

CALCULATE WAF VALUE —S22

CALCULATE TARGET PERFORMANCE VALUE THROUGH CALCULATION USING REFERENCE PERFORMANCE VALUE AND WAF VALUE —S23

EXECUTE WRITE COMMAND ACCORDING TO WRITE BANDWIDTH BASED ON SECOND PERFORMANCE CORRESPONDING TO TARGET PERFORMANCE VALUE —S24

Figure 9:
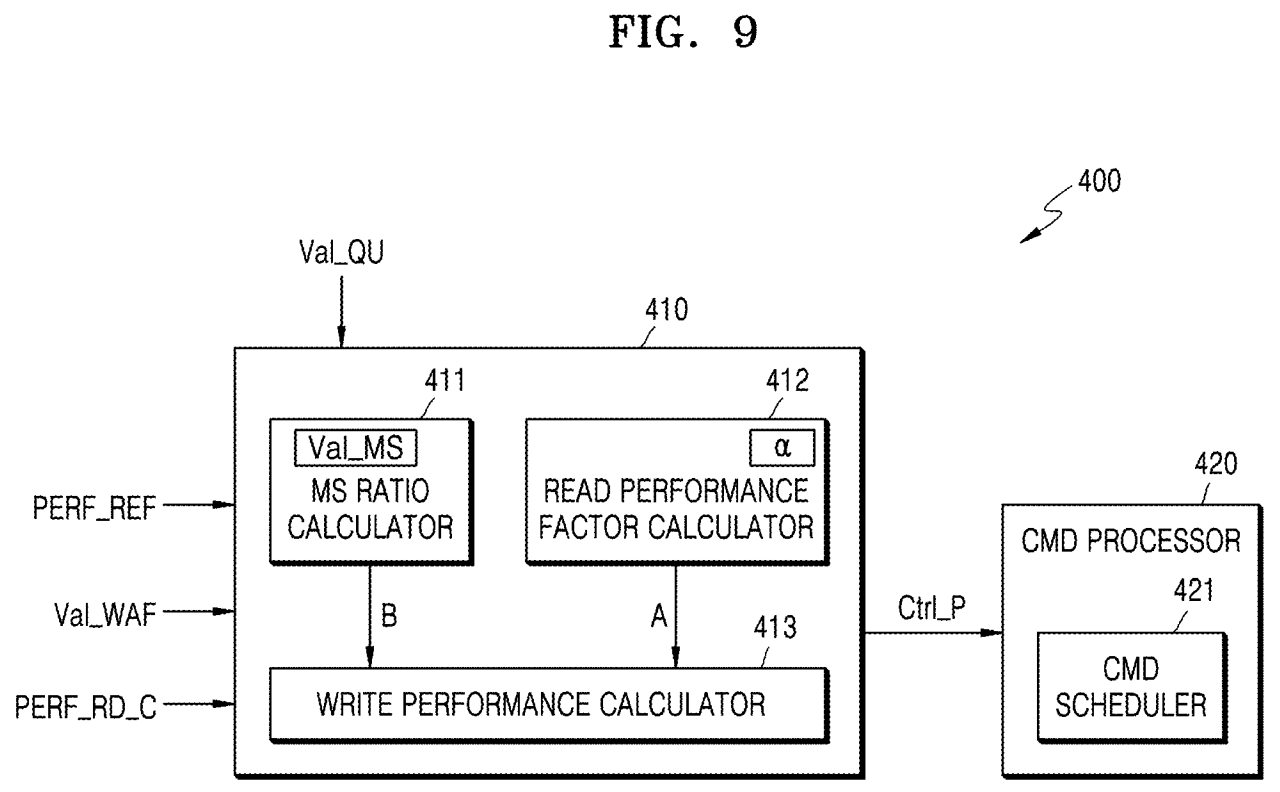

CMD PROCESSOR 420

CMD SCHEDULER 421

CtrlP

410

Val_QU

MS RATIO CALCULATOR 411

Val_MS

READ PERFORMANCE FACTOR CALCULATOR 412

α

A 413

WRITE PERFORMANCE CALCULATOR

B

PERF_REF

Val_WAF

PERF_RD_C

FIG. 14A

MEMORY CONTROLLER CONTROLLING POWER CONSUMPTION, MEMORY SYSTEM INCLUDING THE SAME, AND METHOD OF OPERATING MEMORY CONTROLLER

CROSS-REFERENCE TO RELATED APPLICATION

This application is based on and claims priority under 35 U.S.C. § 119 to Korean Patent Application Nos. 10-2023-00144181, filed on Oct. 25, 2023, and 10-2024-0003117, filed on Jan. 8, 2024, in the Korean Intellectual Property Office, the disclosures of which are incorporated by reference herein in their entireties.

BACKGROUND

The inventive concepts relate to memory controllers, memory systems including the memory controllers, and methods of operating the memory controllers, and more particularly, to memory controllers controlling power consumption, memory systems including the memory controllers, and methods of operating the memory controllers.

Memory systems may be generally classified into volatile memory systems and non-volatile memory systems. The non-volatile memory retains stored data even when power supply thereto is interrupted, while the volatile memory has data deleted when power supply thereto is interrupted. The non-volatile memory may include read only memory (ROM), a magnetic disk, an optical disk, flash memory, resistive random access memory (RRAM), phase-change memory (PRAM), magnetoresistive random access memory (MRAM), or the like. As memory systems, solid state drives (SSDs) including the non-volatile memory have been used in many electronic devices.

The memory systems may consume a large amount of power through memory operations in response to requests from hosts or background operations for internal management. Also, the memory system needs to be managed to consume power within a certain desired or maximum power due to various reasons, such as requests from the host. The power is generally managed by limiting the performance of the memory system, and thus, the performance of the memory system may deteriorate excessively. In addition, even if the memory system operates at a constant performance, power consumption may fluctuate, and as a result, power management of the memory system cannot be performed stably.

SUMMARY

The inventive concepts provide a memory controller, a memory system including the memory controller, and a method of operating the memory controller, by which power of the memory system is more efficiently managed and the memory system may perform memory operations with high performance while consuming power within the desired or maximum power.

According to an aspect of the inventive concepts, there is provided a memory controller including a write amplification factor (WAF) calculator configured to calculate a WAF value relating to a ratio of an amount of data written to the memory device to an amount of write data provided from the host; a performance controller configured to adjust performance of the write operation such that the performance of the write operation decreases, compared to a performance value, as the calculated WAF value increases, the performance controller configured to thereby control the memory device to consume power within a power range; and a command processor configured to control execution of write commands for performing the write operation, based on control by the performance controller.

According to another aspect of the inventive concepts, there is provided a method of operating a memory controller that controls a memory operation of a memory device, the method including calculating a write amplification factor (WAF) value relating to a ratio of an amount of data written to the memory device to an amount of write data provided from a host; reducing performance of the memory operation, compared to a performance value for the memory operation, in inverse proportion to an increase in the calculated WAF value; and adjusting execution scheduling of commands for performing the memory operation according to the reduced performance of the memory operation, wherein at least one of a data write bandwidth in a write operation or a data read bandwidth in a read operation is reduced according to the adjusted execution scheduling of commands.

According to another aspect of the inventive concepts, there is provided a memory system including a memory device; and a memory controller configured to communicate with a host, control a write operation of the memory device, and including a performance controller configured to control the performance of the write operation based on a write amplification factor (WAF) value relating to a ratio of an amount of data written to the memory device to an amount of write data provided from the host, wherein the memory controller is configured to communicate write data as performance to the memory device according to a first write bandwidth based on the WAF value being calculated as a first value, and wherein the memory controller is configured to communicate write data as performance to the memory device according to a second write bandwidth less than the first write bandwidth based on the WAF value being calculated as a second value greater than the first value.

BRIEF DESCRIPTION OF THE DRAWINGS

Example embodiments will be more clearly understood from the following detailed description taken in conjunction with the accompanying drawings in which:

FIG. 2 is a block diagram showing an example of a memory controller according to some example embodiments;

FIG. 9 is a block diagram showing an example of a memory controller according to some example embodiments;

FIGS. 14A and 14B and FIG. 15 are diagrams showing an example of operating a memory system according to some example embodiments;

DETAILED DESCRIPTION OF THE EMBODIMENTS

Hereinafter, some example embodiments are described in detail with reference to the accompanying drawings.

Figure 1:
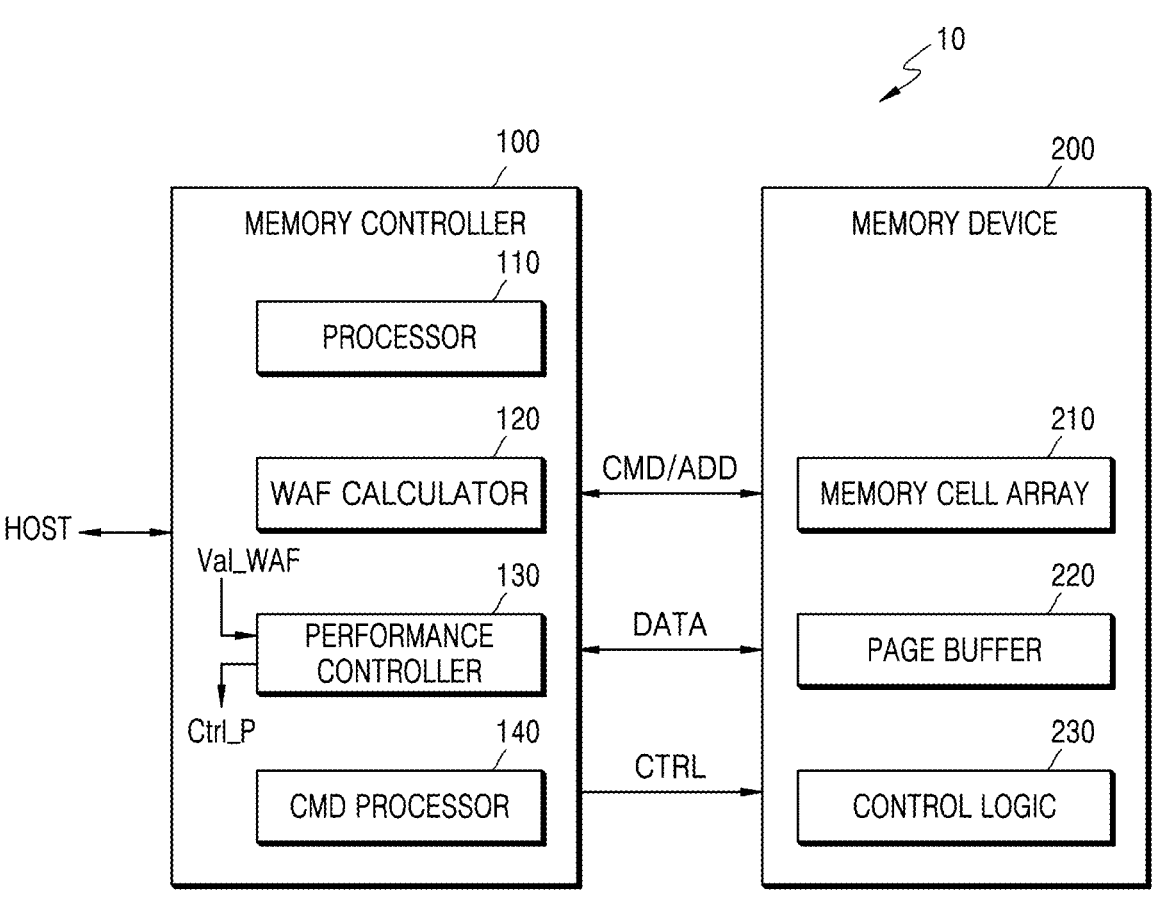
FIG. 1 is a block diagram showing a memory system according to some example embodiments.

FIG. 1 is a block diagram showing a memory system 10 according to some example embodiments.

Referring to FIG. 1, the memory system 10 may include a memory controller 100 and a memory device 200. Also, the memory device 200 may include a memory cell array 210, a page buffer 220, and a control logic 230. The memory cell array 210 may include a plurality of blocks (e.g., memory blocks), each of the blocks may include a plurality of pages, and each of the pages may include a plurality of memory cells. Also, the page buffer 220 may store write data and read data in page units and include a plurality of buffer units respectively corresponding to the plurality of memory cells on the page.

The memory system 10 may communicate with a host via various interfaces. For example, the memory system 10 may communicate with the host via various interfaces, such as a universal serial bus (USB), a multimedia card (MMC), an embedded MMC (eMMC), a peripheral component interconnection (PCI), a PCI-express (PCI-e), an advanced technology attachment (ATA), a serial-ATA, a parallel-ATA, a small computer small interface (SCSI), an enhanced small disk interface (ESDI), integrated drive electronics (IDE), a firewire, a universal flash storage (UFS), and/or a nonvolatile memory express (NVMe).

According to some example embodiments, the memory device 200 may include a non-volatile memory device. In some example embodiments, the memory system 10 may be embedded in an electronic device or provided as removable memory. For example, the memory system 10 may be provided in various forms, such as an embedded UFS memory device, an eMMC, a solid state drive (SSD), a UFS memory card, a compact flash (CF) card, a secure digital (SD) card, a micro secure digital (Micro-SD) card, a mini secure digital (Mini-SD) card, an extreme digital (xD) card, and/or a memory stick. Also, the memory system 10 may be referred to as a storage device that stores data in a non-volatile manner.

The memory controller 100 may control the memory device 200 to read data stored in the memory device 200 or write (or program) data on the memory device 200 in response to a write/read request from a host HOST. For example, the memory controller 100 may include a processor 110, and the processor 110 may control all operations in the memory controller 100 and also control memory operations of the memory device 200. Specifically, the memory controller 100 provides a command/address CMD/ADD and a control signal CTRL to the memory device 200 under control by the processor 110 and may control write, read, and erase operations of the memory device 200. The control logic 230 may control all operations of the memory device 200. For example, based on the command/address CMD/ADD and the control signal CTRL received from the memory controller 100, the control logic 230 may output various internal control signals for writing data in the memory cell array 210 or reading data from the memory cell array 210. Also, data DATA to be stored in the memory device 200 and data DATA read from the memory device 200 may be transmitted and received between the memory controller 100 and the memory device 200.

In some example embodiments, the memory cell array 210 may include a 3-dimensional memory cell array, the 3-dimensional memory cell array may include a plurality of NOT-AND (NAND) strings, and each of the NAND strings may include memory cells respectively connected to word lines vertically stacked on a substrate. However, the example embodiments are not limited thereto. In some example embodiments, the memory cell array 210 may include a 2-dimensional memory cell array and the 2-dimensional memory cell array may include a plurality of NAND strings arranged in row and column directions. Hereinafter, some example embodiments in which the memory cells include NAND flash memory cells are described in detail as an example. However, the example embodiments are not limited thereto. The memory cells may include other types of non-volatile memory cells, such as resistive RAM (ReRAM) cells, phase change RAM (PRAM) cells, and magnetic RAM (MRAM) cells.

According to some example embodiments, the memory controller 100 may further include a write amplification factor (WAF) calculator 120, a performance controller 130, and a command processor 140. In addition, the memory controller 100 may further include other components relating to control of memory operations. For example, the memory controller 100 may include a host interface that interfaces with the host HOST and a memory interface (not shown) that interfaces with the memory device 200.

The memory controller 100 may calculate various types of factor values relating to power consumption, such as the workload of the memory device 200, performance of the memory operation, and a method of processing commands and may adjust the performance or power consumption of the memory device 200 or the memory system 10 on the basis of the calculated factor values so that the power consumed by the memory device 200 or the memory system 10 is maintained within a constant range or the power is consumed thereby within a certain desired or maximum power. In the following example embodiments, it is described that the performance or power of the memory device 200 is adjusted. However, in some example embodiments, the performance or power of the memory system 10 may be adjusted. Also, the adjustment of performance in the following example embodiments may be understood as managing power in terms of maintaining consistency of power consumed by the memory device 200.

As an example of the above factor values, the WAF calculator 120 may calculate a WAF value Val_WAF. The WAF calculator 120 may calculate WAF values Val_WAF at a certain period or calculate the WAF values Val_WAF in real time. The WAF value Val_WAF may include information representing a ratio of the amount of data programmed in the memory cell array 210 to the amount of data provided from the host HOST to the memory system 10. For example, the period for which the WAF value Val_WAF is calculated may be set to a relatively short section, and a ratio (e.g., an average ratio) of the amount of data programmed in the memory cell array 210 to the amount of data from the host in the corresponding section may correspond to the WAF value Val_WAF. In some example embodiments, calculation of the WAF value Val_WAF in real time may include calculating the average ratio in units of relatively short sections as described above.

In some example embodiments, the memory system 10 may generate parity data relating to error detection/correction of data through error correction code (ECC) encoding and may program the parity data together with user data into the memory cell array 210. Accordingly, the WAF value Val_WAF may increase. Also, when the memory system 10 includes a non-volatile memory device, background operations, such as garbage collection for securing free blocks, may be performed. The background operations perform data write/read operations regardless of requests from the host, which may cause an increase in the WAF value Val_WAF. Also, the memory system 10 may manage data write/read operations of the memory cell array 210 according to a certain mapping size (e.g., a page size of 16 KB). When the size of data (e.g., a request unit) provided from the host is 4 KB, 8 KB, etc., which is smaller than the mapping size, the amount of data programmed into the memory cell array 210 increases compared to the data provided from the host, which may cause an increase in the WAF value Val_WAF. In addition, the WAF value Val_WAF may change in the memory system 10 due to various other factors.

The write operation may consume a lot of power. Therefore, when a large amount of data is written to the memory cell array 210 compared to the request from the host, the power consumed by the memory device 200 further increases. Accordingly, an increase in the WAF value Val_WAF may indicate that the power consumed by the memory device 200 increases, and for example, indicate that a large amount of power is consumed in the memory device 200, regardless of the performance of the memory operation provided in the host. On the other hand, a decrease in the WAF value Val_WAF may indicate that the power consumed by the memory device 200 decreases.

The performance controller 130 may perform throttling to adjust the performance of the memory device 200 on the basis of the WAF value Val_WAF. For example, the memory controller 100 may adjust the performance of the memory device 200 on the basis of the control of the performance controller 130 and regulate power consumed by the memory device 200. When the WAF value Val_WAF is relatively large, the performance controller 130 may perform throttling so that the performance of the memory device 200 becomes relatively low. On the other hand, when the WAF value Val_WAF is relatively small, the performance controller 130 may perform throttling so that the performance of the memory device 200 becomes relatively high.

Performance control of the memory device 200 may be performed through various methods. In some example embodiments, performance controls may relate to a response rate (a data write rate and a data read rate) with respect to requests from the host. Also, the performance control may relate to a write/read bandwidth per unit time in write and read operations (the amount of data written or read per unit time). Also, the performance control may relate to the number of commands executed per unit time in the memory system 10. In the following example embodiments, the write bandwidth for the memory cell array 210 is described as an example relating to the performance control. However, in some example embodiments, the performance may be adjusted based on various other methods.

The command processor 140 may control the memory operation of the memory device 200 by executing commands and may control execution of commands in response to a performance control signal Ctrl_P from the performance controller 130 according to some example embodiment. For example, the command processor 140 may adjust a command execution frequency (or the number of commands processed per unit time) in response to the performance control signal Ctrl_P. That is, the command processor 140 may control the amount of data written to the memory cell array 210 by adjusting the execution frequency of write commands. Accordingly, the power consumed by the memory device 200 may increase or decrease.

In some example embodiment, a reference performance value in the data write operation is preset, and the performance of the write operation may be adjusted based on the calculation of the reference performance value and the WAF value Val_WAF. Since the amount of data written to the memory cell array 210 may be at least equal to or greater than the data provided from the host, the WAF value Val_WAF may have a value of 1 or more. When the calculated WAF value Val_WAF is 1, the write operation may be performed at the desired or maximum performance corresponding to the reference performance value. On the other hand, when the WAF value Val_WAF increases, the performance of the write operation may be adjusted to be lower than the reference performance value in inverse proportion to the increase in the WAF value Val_WAF.

The memory system 10 may operate to satisfy the request from the host or preset power conditions for more stable power consumption. Also, a method of managing power by limiting the performance of the memory system 10 to a certain level has been proposed. However, even if the performance of the memory system 10 is kept constant, actual power consumed thereby may not remain constant but may fluctuate due to the WAF value Val_WAF and various other factors mentioned above, and thus, the actual power may deviate from the above power conditions. Also, the power condition may be satisfied by lowering the target performance of the memory system 10 considering power fluctuations. However, in this case, the performance of the memory system 10 may unnecessarily degrade.

On the other hand, in some example embodiments, the factor values (e.g., the WAF value Val_WAF) relating to the actual power fluctuation of the memory system 10 are calculated in real time or periodically, and the performance of the memory operation may be controlled based on these factor values. Therefore, power management that satisfies the power conditions while maintaining optimal performance of the memory system 10 may be performed. That is, according to some example embodiments, the constant power consumption may be maintained and the performance of the memory system 10 may be improved within limited power.

Also, according to some example embodiment, the WAF value Val_WAF relating to the performance control is described as the ratio of the amount of data written to the memory cell array 210 to the amount of data from the host. However, the example embodiments are not necessarily limited thereto. For example, the WAF value Val_WAF described in the example embodiments is based on the amount of data from the host and the amount of data written to the memory cell array 210 but may include a value calculated through an operation using at least one coefficient. That is, according to some example embodiments, the WAF value Val_WAF calculated for performance control may be calculated through an operation of various types of information, and an increase in the WAF value Val_WAF may indicate that the power consumed by the memory device 200 increases.

Also, each of the WAF calculator 120 and the performance controller 130 as components shown in FIG. 1 may include hardware, software, or a combination thereof. Also, the components of the memory device 200 shown in FIG. 1 may be provided in one memory chip or die. The memory system 10 in some example embodiments may include a plurality of memory chips, and each of the memory chips may include components of the memory device 200 shown in FIG. 1.

Also, when the memory system 10 includes the plurality of memory chips, the WAF value Val_WAF described above may include a common value calculated for the plurality of memory chips. For example, the memory controller 100 may determine the amount of data written to the plurality of memory chips compared to the amount of received written data and may calculate the WAF value Val_WAF on the basis of this determination. Also, in a modified example, the amount of data to be written to the memory cell array of each memory chip may be determined in comparison to the data write requested for each memory chip. Accordingly, the WAF value Val_WAF may be calculated in units of memory chips, and the performance may be adjusted in units of memory chips.

FIG. 2 is a block diagram showing an example of a memory controller 300 according to some example embodiments.

Referring to FIG. 2, the memory controller 300 may include a host interface 310, a processor 320, random access memory (RAM) 330, a performance control module 340, a command processor 350, a WAF calculation module 360, and a memory interface 370. Also, the RAM 330 may be used as working memory, and the processor 320 may control all operations of the memory controller 300 by executing firmware loaded in the RAM 330. The RAM 330 may be provided as various memories. For example, the RAM 330 may be provided as at least one of resistive memory devices, such as cache memory, dynamic random access memory (DRAM), static random access memory (SRAM), and PRAM.

As an example of firmware, a flash translation layer (FTL) may be loaded into the RAM 330, and various functions relating to flash memory operations may be performed by driving the FTL. Also, the performance control module 340 or the WAF calculation module 360 may be provided as hardware, software, or a combination thereof. For example, when the WAF calculation module 360 is provided in the form of software as firmware, the WAF calculation module 360 may be loaded into the RAM 330 and executed by the processor 320. In addition, when the WAF calculation module 360 is provided as hardware, the WAF calculation module 360 may include circuits that perform calculation processing on various pieces of information relating to WAF calculation.

The host interface 310 may communicate with a host through various types of interfaces according to some example embodiments. Also, the memory interface 370 provides a physical connection between the memory controller 300 and a memory device (e.g., a non-volatile memory device NVM). For example, the command/address and data may be transmitted and received between the memory controller 300 and the non-volatile memory device NVM via the memory interface 370. The frequency of command output or the amount of data transmission via the memory interface 370 may be changed based on the performance adjustment according to some example embodiments.

Regarding the performance control for the non-volatile memory device NVM, the performance control module 340 may provide a performance control signal Ctrl_P to at least one component in the memory controller 300 on the basis of the WAF value Val_WAF from the WAF calculation module 360. For example, the performance control signal Ctrl_P may be provided to the command processor 350, and the command processor 350 may perform a control operation, such as adjusting the execution frequency of commands, so as to control performance of the non-volatile memory device NVM.

Figure 3:
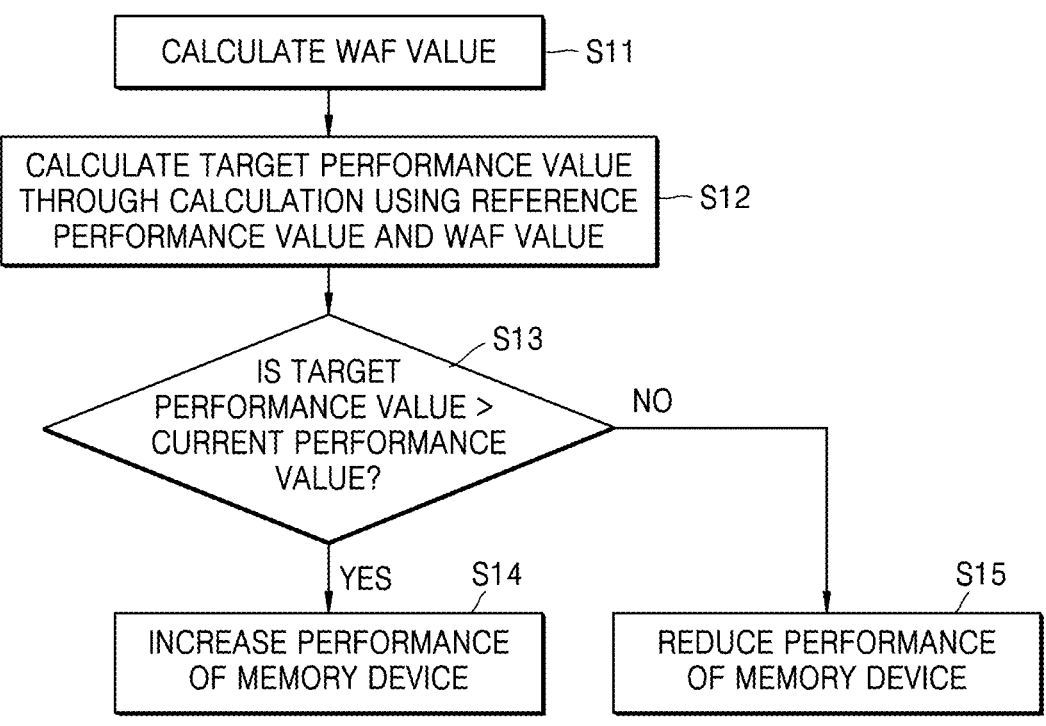
FIGS. 3 and 4 are flowcharts showing a method of operating a memory system, according to some example embodiments.
Figure 4:
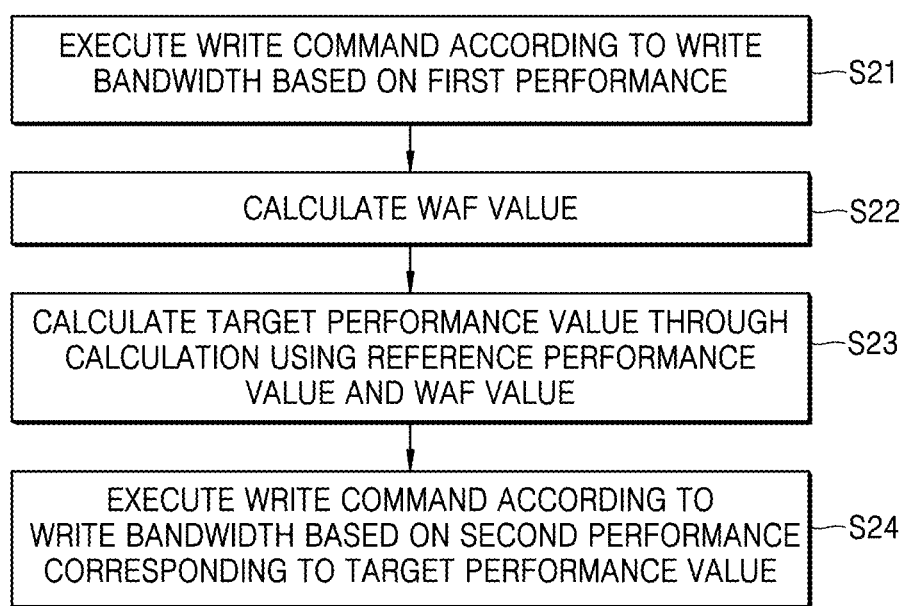

FIGS. 3 and 4 are flowcharts showing a method of operating a memory system, according to some example embodiments. Each of the operations in FIGS. 3 and 4 may be performed by a memory controller or a memory device.

As factor values for controlling the performance of the memory device, the memory controller may calculate WAF values in real time or periodically (S11), and the WAF values may be calculated through an operation using the amount of data provided from a host and the amount of data written to a memory cell array. In addition, a reference performance value may be preset for the memory device, and information about the reference performance value may be stored in the memory system. Also, the memory controller may perform the calculation using information about the reference performance value and the calculated current WAF value. Based on the calculation result, a target performance value for the memory device may be calculated (S12).

For example, the reference performance value may correspond to the desired or maximum performance of a memory operation set within the desired or maximum power that may be consumed by the memory system. Also, assuming that the WAF value represents the ratio of the amount of data written to the memory cell array to the amount of data provided from the host, the memory controller may control the memory operation using the reference performance value described above when the calculated current WAF value is 1. On the other hand, when the current WAF value becomes greater than 1, the performance adjustment may be conducted so that the memory operation is performed at lower performance compared to the reference performance value.

In some example embodiments, it may be determined whether the calculated target performance value is greater than the current performance value of the memory device (S13). Also, if the target performance value is greater than the current performance value, the performance adjustment may be performed to increase the performance of the memory device (S14). On the other hand, if the target performance value is less than the current performance value, the performance adjustment may be performed to reduce the performance of the memory device (S15).

Assuming that the performance adjustment corresponds to a write bandwidth of data for the memory cell array, the write bandwidth may decrease through the decrease in performance. In this case, when the number of write requests provided from the host is relatively small, the write operation may be performed within the write bandwidth even without delaying execution of write commands. On the other hand, when there are relatively many write requests provided from the host, the performance control is conducted so that the write operation on the memory device is performed within the reduced write bandwidth through command scheduling, such as delaying the execution of write commands.

Also, an example of performance adjustment based on write command execution and write bandwidth is described with reference to FIG. 4.

Referring to FIG. 4, the memory controller may execute a write command to the memory device according to the write bandwidth according to first performance (S21). For example, the memory controller may include a command scheduler, and the command scheduler may perform command scheduling so that write commands are executed corresponding to the first performance. For example, when data having the same size is written to the memory cell array by executing each of the write commands, the write bandwidth of data may be adjusted by adjusting the number of executions of write commands per unit time.

According to some example embodiments, the WAF value may be calculated in real time or periodically (S22), and the target performance value may be calculated through calculation using information relating to the above-mentioned reference performance value and the current WAF value (S23). The target performance value may be calculated as a value of second performance that is different from the first performance described above, and the memory controller may execute a write command to the memory device according to the write bandwidth on the basis of the second performance (S24). When the second performance is lower than the first performance, the memory controller may reduce the performance of the memory device by reducing the frequency of execution of write commands or reducing the write bandwidth of data.

Figure 5:
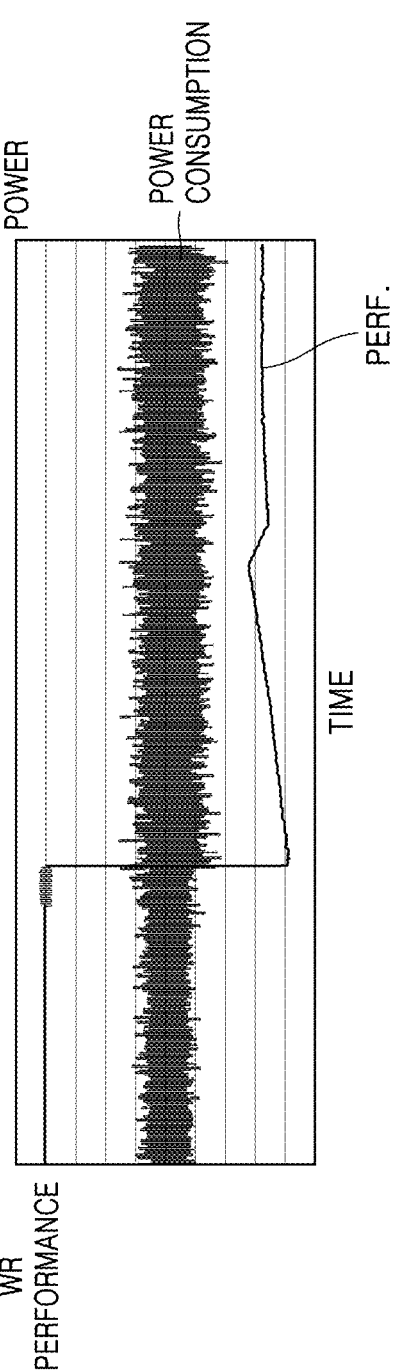
FIG. 5 is a graph showing a case in which power consumption in a memory device is maintained constant, according to some example embodiments.

FIG. 5 is a graph showing a case in which power consumption in a memory device is maintained constant, according to some example embodiments. In the graph of FIG. 5, the vertical axis on the left may represent performance of a write operation, the vertical axis on the right may represent power consumption, and the horizontal axis may represent time.

As shown in FIG. 5, the memory system according to the inventive concepts may maintain power consumption within a certain range without exceeding a desired or maximum power. For example, as shown in FIG. 5, factor values, such as WAF values, that cause power consumption are calculated, and the performance of the write operation may be adjusted based on these factor values. Accordingly, the power consumption by the memory device may be maintained consistently within a certain range. That is, according to the related art, even when the performance of the memory system is lowered or the performance is maintained so as to limit power consumption, the power consumption fluctuates greatly. On the other hand, according to some example embodiments shown in FIG. 5, the power management may be performed more stably and performance degradation of the memory device may be prevented or reduced in likelihood.

Figure 6:
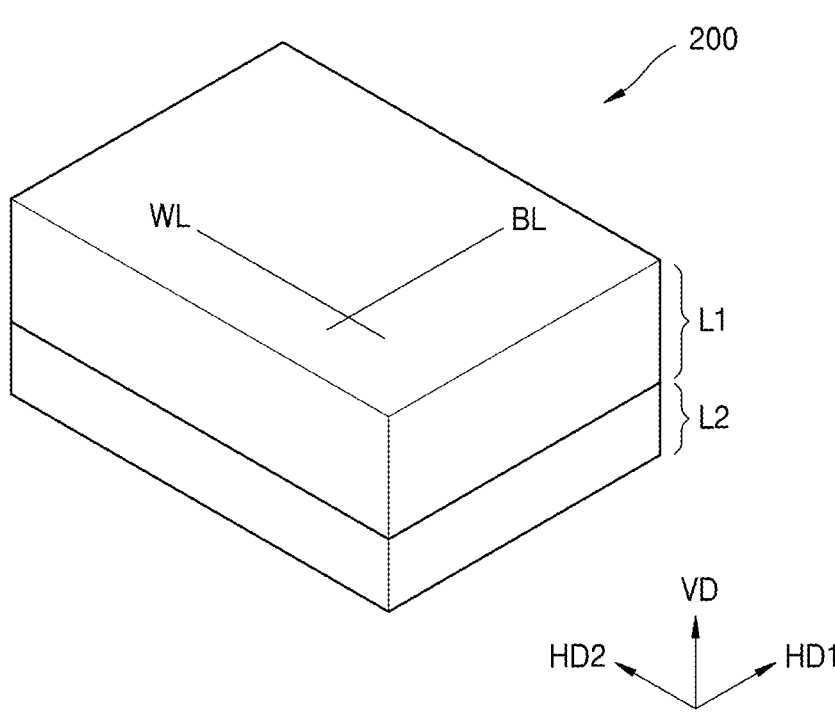
FIG. 6 is a diagram schematically showing a structure of a memory device of FIG. 1, according to some example embodiments.
Figure 7:
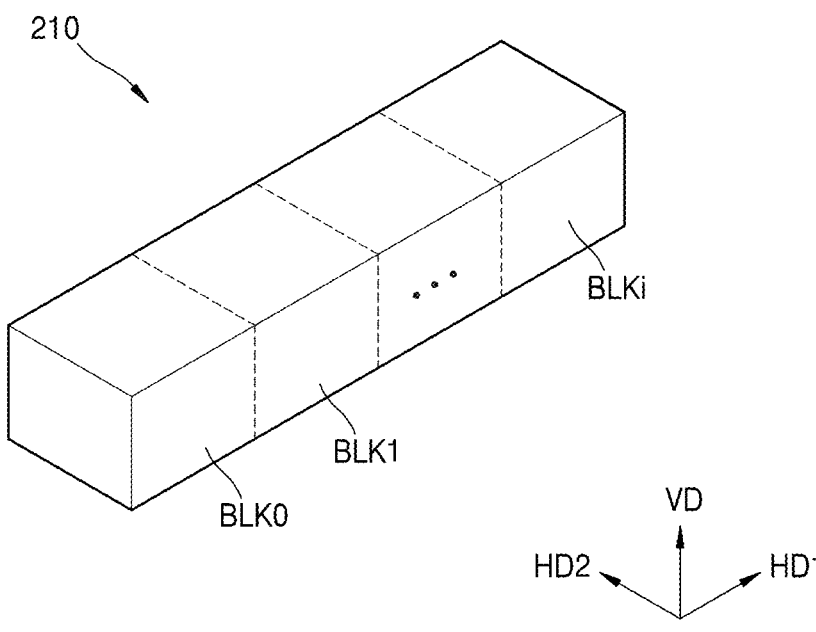
FIG. 7 is a diagram illustrating a memory cell array of FIG. 1.
Figure 8:
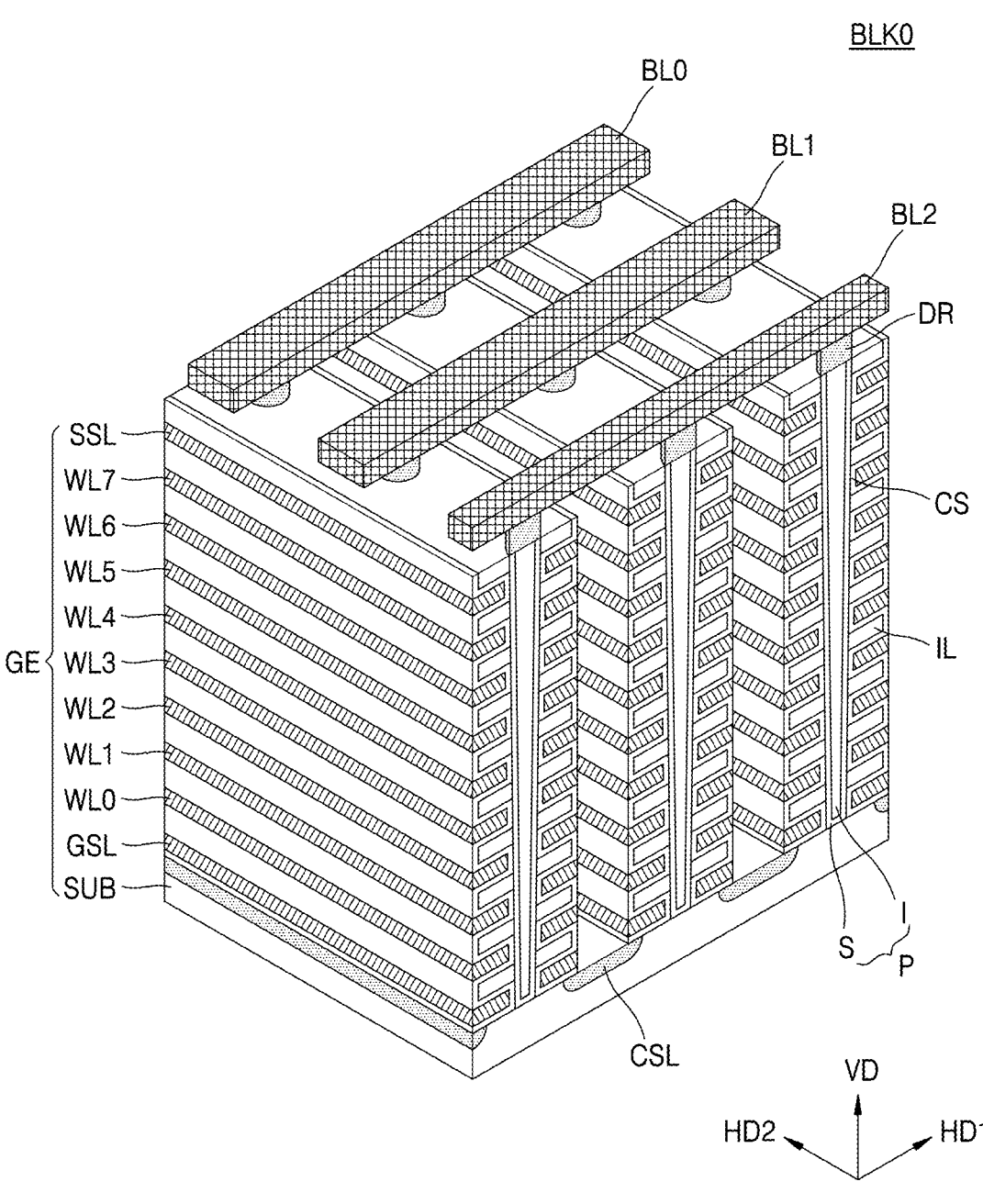
FIG. 8 is a perspective view showing an example of a structure of a block in the memory cell array of FIG. 7.

FIG. 6 is a diagram schematically showing a structure of the memory device 200 of FIG. 1, according to some example embodiments. FIG. 7 is a diagram illustrating the memory cell array 210 of FIG. 1. FIG. 8 is a perspective view showing an example of a structure of a block BLK0 in the memory cell array 210 of FIG. 7. In FIG. 6, a cell over periphery (COP) structure is illustrated as an example of the memory device 200, but the example embodiments are not necessarily limited thereto. The memory device 200 may be provided as various structures.

Referring to FIG. 6, the memory device 200 may include a first semiconductor layer L1 and a second semiconductor layer L2, and the first semiconductor layer L1 may be stacked on the second semiconductor layer L2 in a vertical direction VD. Specifically, the second semiconductor layer L2 may be disposed below the first semiconductor layer L1 in the vertical direction VD, and thus, the second semiconductor layer L2 may be located close to a substrate.

In some example embodiments, the memory cell array 210 of FIG. 1 may be formed in the first semiconductor layer L1, and other peripheral circuits of FIG. 1 may be formed in the second semiconductor layer L2. Accordingly, the memory device 200 may have a structure in which the memory cell array 210 is disposed above the peripheral circuit, that is, a COP structure. The COP structure may effectively reduce the area in the horizontal direction and improve the degree of integration of the memory device 200.

In some example embodiments, the second semiconductor layer L2 may include a substrate. Also, transistors and metal patterns for wiring the transistors are formed on the substrate, and as a result, the peripheral circuit may be formed in the second semiconductor layer L2. The peripheral circuit is formed in the second semiconductor layer L2, and then the first semiconductor layer L1 including the memory cell array 210 may be formed thereon. Also, metal patterns may be formed to electrically connect word lines WL and bit lines BL of the memory cell array 210 to the peripheral circuit formed in the second semiconductor layer L2. For example, the bit lines BL may extend in a first horizontal direction HD1 and the word lines WL may extend in a second horizontal direction HD2.

Also, referring to FIG. 7, the memory cell array 210 may include a plurality of blocks BLK0 to BLKi, where i is a positive integer. Each of the plurality of blocks BLK0 to BLKi may have a 3-dimensional structure (or a vertical structure). Specifically, each of the blocks BLK0 to BLKi may include a plurality of NAND strings extending in the vertical direction VD. Also, the plurality of NAND strings may be spaced apart from each other by a specific distance in the first and second horizontal directions HD1 and HD2. The plurality of blocks BLK0 to BLKi may be selected by a row decoder (not shown) of the memory device 200. For example, the row decoder may select a block corresponding to a block address among the plurality of blocks BLK0 to BLKi.

Also, referring to FIG. 8, a block BLK0 is formed in the vertical direction VD on a substrate SUB. The substrate SUB includes regions of a first conductivity type (e.g., p type) that extend in the second horizontal direction HD2 on the substrate SUB, and includes a common source line CSL doped with impurities of a second conductivity type (e.g., n type). A plurality of insulating films IL extending in the second horizontal direction HD2 are sequentially provided in the vertical direction VD above a region of the substrate SUB between two adjacent common source lines CSL. The plurality of insulating films IL are spaced apart from each other by a specific distance in the vertical direction VD. For example, the plurality of insulating films IL may include an insulating material, such as silicon oxide.

A plurality of pillars P sequentially arranged in the first horizontal direction HD1 and passing through the plurality of insulating films IL in the vertical direction VD are provided above the region of the substrate SUB between two adjacent common source lines CSL. For example, the plurality of pillars P may pass through the plurality of insulating films IL and come into contact with the substrate SUB. Specifically, a surface layer S of each of the pillars P may include a silicon material of the first conductivity type and may function as a channel region. Also, an inner layer I of each of the pillars P may include an insulating material, such as silicon oxide and an air gap.

In the region between two adjacent common source lines CSL, a charge storage layer CS is provided along the exposed surfaces of the insulating films IL, the pillars P, and the substrate SUB. The charge storage layer CS may include a gate insulating layer (or referred to as a 'tunneling insulating layer'), a charge trap layer, and a blocking insulating layer. For example, the charge storage layer CS may have an oxide-nitride-oxide (ONO) structure. Also, a gate electrode GE, such as selection lines GSL and SSL and word lines WL0 to WL7, are provided on the exposed surface of the charge storage layer CS in the region between two adjacent common source lines CSL.

Drains or drain contacts DR are respectively provided on the plurality of pillars P. For example, the drains or drain contacts DR may include a silicon material doped with impurities of a second conductivity type. Bit lines BL0 to BL2 are provided on the drains or drain contacts DR, and the bit lines BL0 to BL2 extend in the first horizontal direction HD1 and are spaced apart from each other by a specific distance in the second horizontal direction HD2.

Hereinafter, specific operation examples according to some example embodiments are described below. The following example embodiments describe a case in which the WAF value and the target performance value are calculated based on a variety of information, and the write bandwidth (or the execution frequency of the write command) is adjusted as an example of performance adjustment. However, the example embodiments are not necessarily limited thereto. The WAF value and the target performance value may be calculated based on various other methods, or the performance of various types of memory operations other than the write operation may be adjusted.

FIG. 9 is a block diagram showing an example of a memory controller 400 according to some example embodiments.

Referring to FIG. 9, the memory controller 400 may include a performance controller 410 and a command processor 420, and the command processor 420 may include a command scheduler 421. Also, according to some example embodiments described above, the performance controller 410 may be provided as hardware and/or software, may calculate the target performance value on the basis of the calculation on various pieces of information, and may control the performance of the write operation of the memory device. For example, the performance controller 410 may receive preset performance information (e.g., a reference performance value PERF_REF) and a WAF value Val_WAF relating to the write operation and may output a performance control signal Ctrl_P on the basis of the calculation of the reference performance value PERF_REF and the WAF value Val_WAF.

In some example embodiments, the performance controller 410 may include a mapping size ratio calculator 411, a read performance factor calculator 412, and a write performance calculator 413. In some example embodiments, the performance controller 410 may generate the performance control signal Ctrl_P using only some pieces of the information shown in FIG. 9. For example, at least one of components of the mapping size ratio calculator 411 and the read performance factor calculator 412 may not be provided in the performance controller 410.

The write performance calculator 413 may generate the performance control signal Ctrl_P on the basis of the reference performance value PERF_REF and the WAF value Val_WAF. For example, the write performance calculator 413 performs calculation using the reference performance value PERF_REF and the WAF value Val_WAF and may generate the performance control signal Ctrl_P on the basis of the calculation results. For example, the reference performance value PERF_REF may correspond to the desired or maximum performance of the write operation set in a range in which the consumed power does not exceed the desired or maximum power, and the performance control signal Ctrl_P may be generated so that the performance of the write operation on the memory device is reduced in inverse proportion to an increase in the WAF value Val_WAF. For example, a target performance value PERF_TARG may be calculated through the calculation result based on Equation 1 below, and the performance control signal Ctrl_P may be generated on the basis of the target performance value PERF_TARG.

$$PERF\_TARG=(PERF\_REF)/(Val\_WAF) \qquad \text{[Equation 1]}$$

Also, in some example embodiments, the performance controller 410 may perform performance adjustment by further using information representing the performance of a current read operation (hereinafter, referred to as current read performance information PERF_RD_C). The memory controller 400 may control write/read operations of the memory device and may control the performance of the write operation of the memory device by considering the power consumed by the read operation.

For example, when the power is managed so that the memory device consumes power below preset desired or maximum power, the performance of the write operation may be adjusted while maintaining the performance of the read operation. In one operation example, the power management may be performed such that the power required for the read operation is subtracted from the desired or maximum power and the power required for the write operation is consumed within the subtracted power. In this regard, when calculating the target performance value PERF_TARG, at least one coefficient value together with the current read performance information PERF_RD_C may be used in the calculation.

In some example embodiments, the read performance factor calculator 412 may calculate a read performance factor value A, and the read performance factor value A may correspond to a performance value subtracted from the reference performance value PERF_REF by considering the power consumed by the read operation when calculating the target performance value PERF_TARG. For example, the read performance factor value A may be calculated as a value obtained by multiplying the current read performance information PERF_RD_C by a certain coefficient value $\alpha$. The coefficient value $\alpha$ may be a power coefficient that represents the ratio of the performance of the write operation to the performance of the read operation when the read operation consumes the same power as the write operation. For example, when the read operation with a read bandwidth of 100 MB/s consumes the same power as the write operation with a write bandwidth of 23 MB/s, the coefficient value a may be set to a value of 0.23. The coefficient value $\alpha$ may be calculated and stored through real-time measurement or may be set and stored during a process of manufacturing the memory controller 400.

The write performance calculator 413 may generate the performance control signal Ctrl_P on the basis of the reference performance value PERF_REF, the WAF value Val_WAF, and the read performance factor value A. For example, when the write operation and the read operation are performed together according to the sequential execution of commands, the memory controller may operate in a read/write mixed mode (RW Mixed mode). The target performance value PERF_TARG according to some example embodiments may be calculated through an operation result based on Equation 2 below in the RW mixed mode (where A is α*PERF_RD_C).

$$PERF\_TARG=(PERF-A)/(Val\_WAF) \quad \text{[Equation 2]}$$

In some example embodiments of Equation 2 above, the read performance may represent the performance of the read operation in response to a read request from the host or may represent the performance of the read operation performed by a background operation within the memory system. In some example embodiments, the current read performance information PERF_RD_C may be generated based on the performance of the read operation by a request from the host and/or the background operation.

Also, in some example embodiments, the performance controller 410 may perform performance adjustment by further using information relating to the request unit from the host and the mapping size of the memory system. For example, the mapping size ratio calculator 411 may perform calculation using a request unit value Val_QU representing the request unit from the host (e.g., the data reception unit from the host) in the write operation and a mapping size value Val_MS representing the mapping size of the memory system (e.g., the data program unit to the memory cell array). For example, the mapping size ratio calculator 411 may provide the write performance calculator 413 with a ratio value B representing the ratio of the mapping size value Val_MS to the request unit value Val_QU.

When the memory device includes a flash memory device, the flash memory device may write data according to a certain mapping size (e.g., a page size such as 16 KB). Also, when the request unit from the host is 4 KB, the memory device may write data by programming, into one page, 16 KB of data that includes 4 KB of newly updated data provided by the host for another page and 12 KB of data previously stored on the page. In this case, the amount of data actually programmed into the memory device may increase compared to the data provided from the host, and the power consumed by the memory device may increase. That is, according to the above, even if the memory devices operate with the same performance, the power consumption thereby may vary depending on the request units of the host.

In some example embodiments, the performance adjustment operation based on the request unit from the host and the mapping size of the memory device may be applied. For example, the write performance calculator 413 may generate the performance control signal Ctrl_P on the basis of the reference performance value PERF_REF, the WAF value Val_WAF, the read performance factor value A, and the ratio value B. The ratio value B may increase as the request unit value Val_QU decreases. For example, the target performance value PERF_TARG according to some example embodiments may be calculated through an operation result based on Equation 3 below (where B is (Val_MS)/(Val_QU)).

[Equation 3]

$$PERF\_TARG=(PERF\_REF-A)/(Val\_WAF*B)$$

The performance controller 410 may generate the performance control signal Ctrl_P on the basis of the various calculation methods described above and provide the performance control signal Ctrl_P to the command processor 420. The command processor 420 may include the command scheduler 421, and the command scheduler 421 may control the write performance of the memory device by adjusting the command execution frequency on the basis of the performance control signal Ctrl_P.

Also, in calculating the target performance value PERF_TARG in Equation 3 above, a case is described in which both the WAF value Val_WAF in Equation 1 and the read performance factor value A in Equation 2 are used, but some example embodiments are not necessarily limited thereto. For example, the target performance value PERF_TARG may be calculated using only the reference performance value PERF_REF, the WAF value Val_WAF, and the ratio value B without using the read performance factor value A. Also, the target performance value PERF_TARG may be calculated using only the reference performance value PERF_REF and the ratio value B.

Also, in the example shown in FIG. 9, the mapping size ratio calculator 411 and the read performance factor calculator 412 are shown as separate components in relation to each of operations described in Equations 1 to 3, but the example embodiments are not necessarily limited thereto. For example, the performance controller 410 may be configured to receive various pieces of information relating to calculation of write performance and perform an operation corresponding to one of Equations 1 to 3. In addition, Equations 1 to 3 have been described as schematic equations to describe the inventive concepts, but more specific performance may be calculated by using more various coefficients or applying additional operations thereto.

Figure 10:
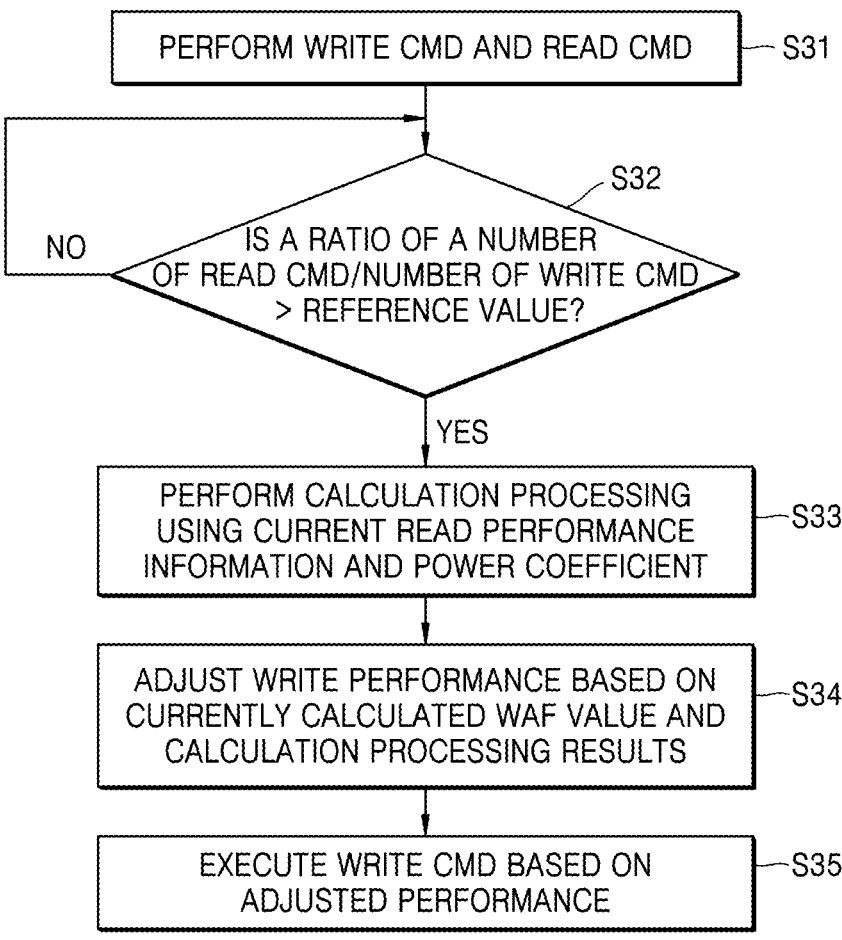
FIGS. 10 and 11 are diagrams illustrating an example of adjusting performance in a read/write (RW) mix mode, according to some example embodiments.
Figure 11:
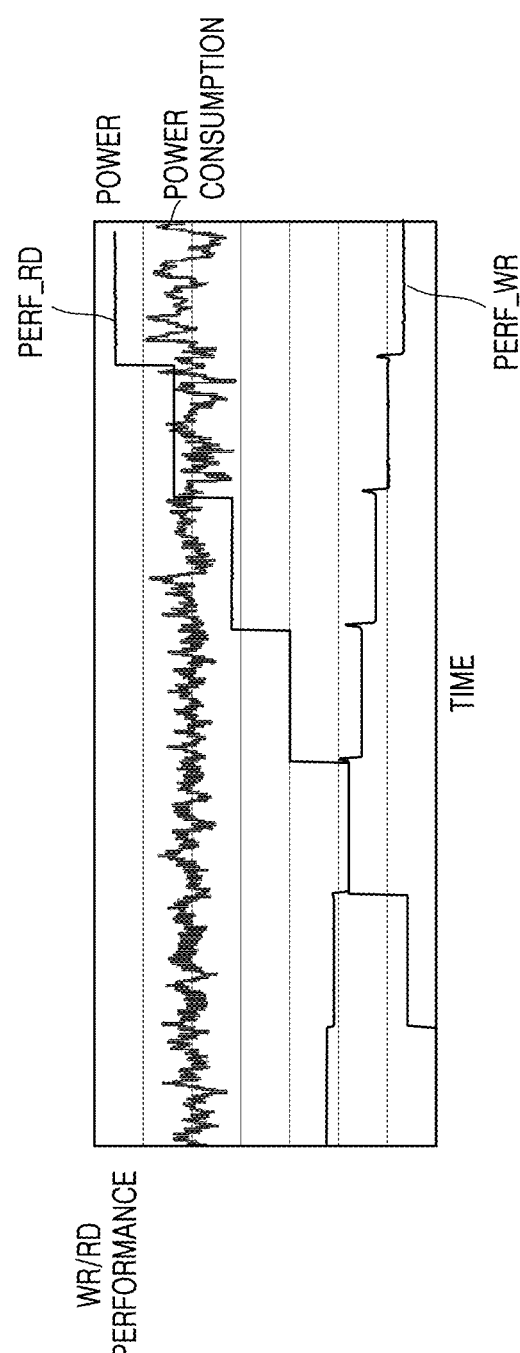

FIGS. 10 and 11 are diagrams illustrating an example of adjusting performance in an RW mix mode, according to some example embodiments.

According to the example described above, the performance of the write operation may be set based on the remaining power excluding the power consumed by the read operation from the desired or maximum power that may be consumed thereby. A memory controller may execute a write command and a read command upon the request from a host (S31).

In some example embodiments, the memory controller may determine whether to perform performance adjustment according to the RW mix mode. In an operation example, the memory controller may determine whether the ratio of read commands to the number of write commands is greater than a certain reference value (S32) and perform power adjustment according to the RW mix mode on the basis of the determination result. The determination operation described above may be performed based on various methods. For example, the determination is made based on the number of write commands and read commands executed during a certain period, or the determination may be performed based on the number of write commands and read commands to be subsequently performed on the basis of the number of requests fetched from the host.

In relation to performance adjustment according to the RW mix mode, the memory controller may perform calculation processing using a certain coefficient value (e.g., the power coefficient in Equation 2) together with current read performance information relating to the performance of the read operation (S33). For example, the read performance factor value in some example embodiments may be calculated according to the calculation processing, and a result may be calculated by subtracting the read performance factor value from the desired or maximum performance within the desired or maximum power that may be consumed thereby.

The memory controller may adjust the performance of the write operation on the basis of the above calculation processing results and the currently calculated WAF value (S34). For example, according to some example embodiments, the target performance value may be calculated through the operation of dividing the performance according to the calculation processing result by the currently calculated WAF value, and the write performance may be adjusted to correspond to the target performance value. The memory controller may execute the write command according to the adjusted performance (S35). For example, the memory controller may control the amount of data written to the memory cell array by adjusting the execution frequency of the write command, thereby controlling the power consumed by the memory device.

FIG. 11 is a graph showing a case in which the power consumption is maintained constant according to the example embodiments of FIG. 10. In the graph, the vertical axis on the left may represent write/read performance, the vertical axis on the right may represent power consumption, and the horizontal axis may represent time.

As shown in FIG. 11, the memory system according to the inventive concepts may maintain power consumption within a certain range without exceeding the desired or maximum power. For example, as the performance of the read operation increases, the value of the result obtained by subtracting the factor value relating to the performance of the read operation from the desired or maximum performance may decrease. Therefore, according to the operation example, the power may be managed so that the performance of the write operation decreases when the performance of the read operation increases. When read and write operations are performed, the power consumed by the memory device may be more stably maintained within a certain range.

Figure 12:
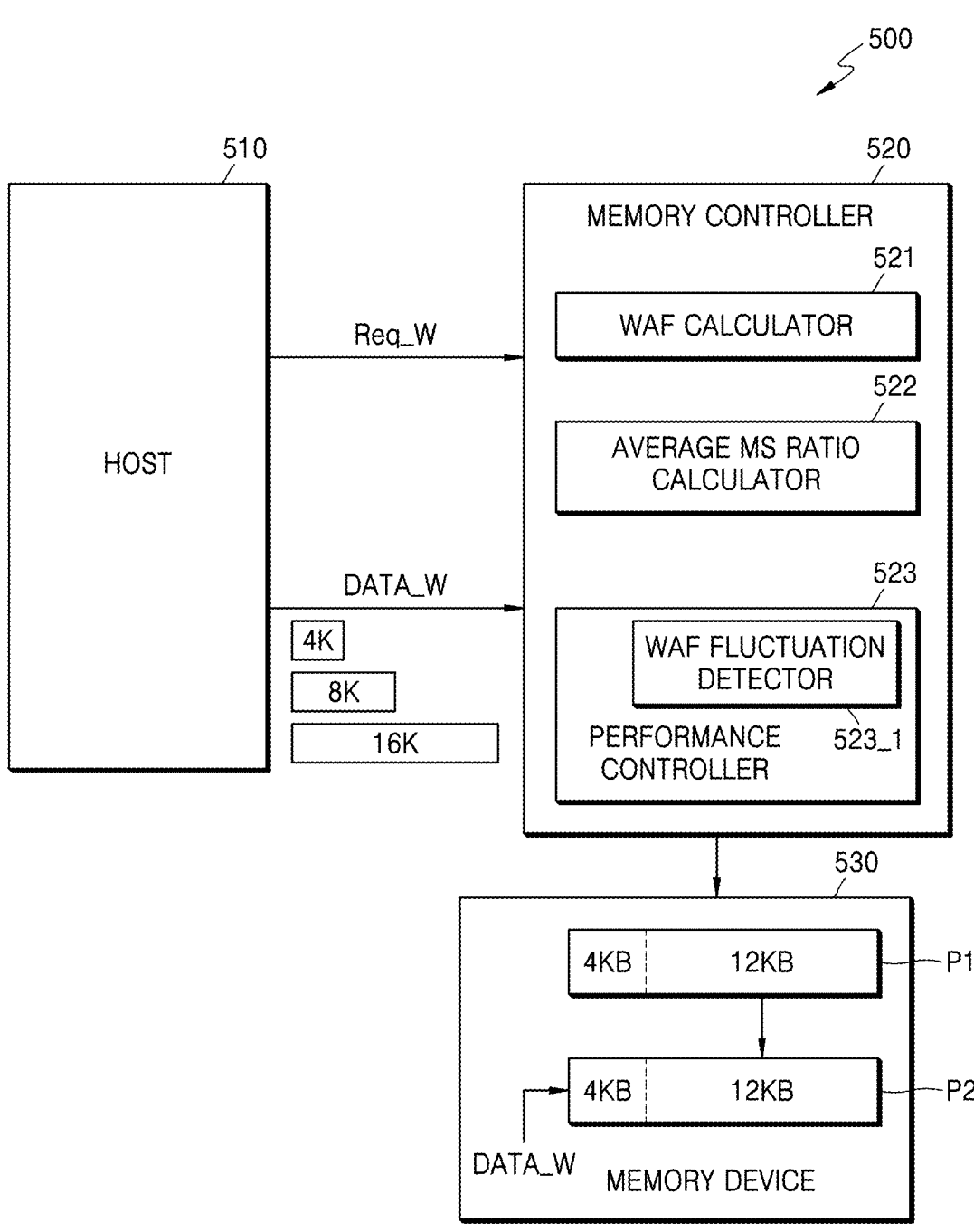
FIGS. 12 and 13 are diagrams illustrating an example of adjusting performance considering a host write amplification factor (WAF), according to some example embodiments.
Figure 13:
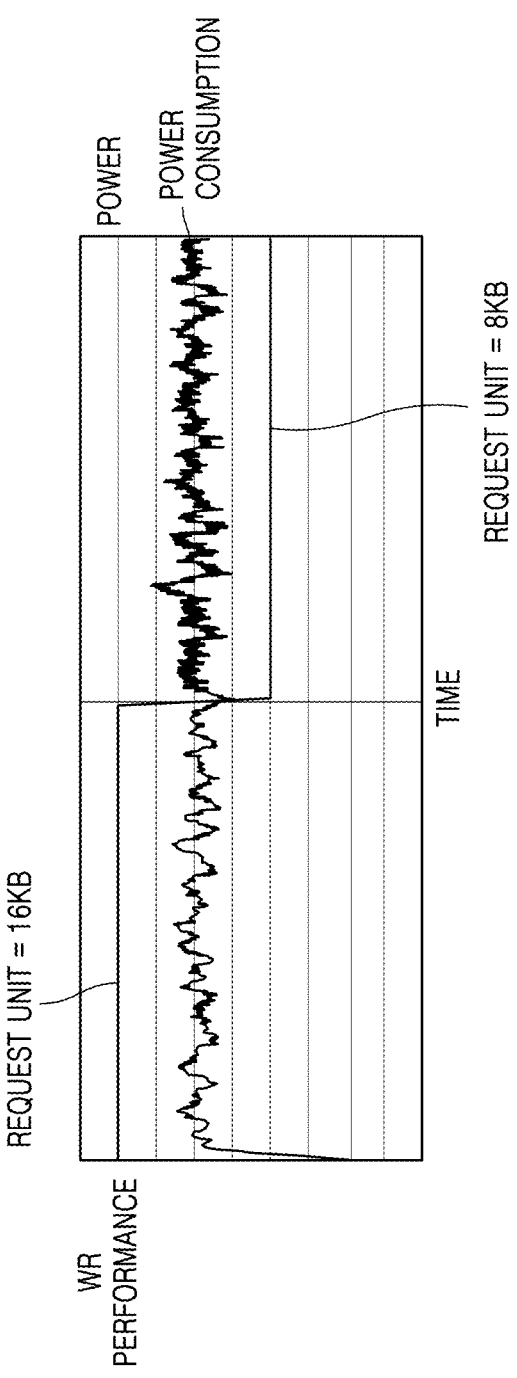

FIGS. 12 and 13 are diagrams illustrating an example of adjusting performance considering a host WAF, according to some example embodiments. The host WAF may correspond to a WAF value considering the request unit from the host 510 described in the above example embodiments. For example, the host WAF may correspond to (Val_WAF)*(Val_MS/Val_QU).

Referring to FIG. 12, a data processing system 500 may include a host 510 and a memory system, and the memory system may include a memory controller 520 and a memory device 530. For example, when the memory system is employed in a server or the like, data from a plurality of users may be stored in the memory device 530. Also, although a single host 510 is shown in FIG. 12, a plurality of hosts may share the memory system.

The host 510 may provide write data DATA_W together with a write request Req_W to the memory controller 520. For example, depending on the request unit, the host 510 may provide the write data DATA_W of 4 KB, 8 KB, or 16 KB in size to the memory controller 520. The memory controller 520 may include a WAF calculator 521, an average mapping size ratio calculator 522, and a performance controller 523. Also, in some example embodiments, the performance controller 523 may include a WAF fluctuation detector 523_1. The memory controller 520 may control the write operation on the memory device 530 in response to a write request Req_W from the host 510 and may provide the write data DATA_W to the memory device 530.

The memory device 530 may include a memory cell array, and the memory cell array may include a plurality of pages. It is assumed that the request unit from the host 510 is 4 KB, each of the pages has a size of 16 KB, and the mapping size as a unit of data written to the memory cell array is 16 KB.

Taking a first page P1 and a second page P2 as examples, the write request Req_W from the host 510 may correspond to a request for updating 4 KB of data on the first page P1 with new data. The data in a unit of 16 KB, including 4 KB of the write data DATA_W from the host 510 and the remaining 12 KB of data from the first page P1, may be written to the second page P2 on the basis of the control by the memory controller 520. If the request unit is 8 KB, the data in a unit of 16 KB, including the write data DATA_W from the host 510 and the remaining 8 KB of data of the first page P1, may be written to the second page P2.

The WAF calculator 521 may calculate the WAF value according to the example embodiments described above. Also, the average mapping size ratio calculator 522 may calculate an average mapping size ratio indicating the ratio of the mapping size of the memory system to the request unit from the host 510 during a certain period of time. For example, when the host 510 changes the request unit or when a plurality of hosts having different request units provide the write request Req_W to the memory controller 520, the calculated average mapping size ratio may vary in value.

The performance controller 523 may adjust the performance of the write operation through various methods according to the example embodiments described above. For example, the performance of the write operation may be adjusted through the calculation processing based on Equation 3 described above. For example, if the average mapping size ratio is calculated according to a certain period, the performance of the write operation may be adjusted in accordance with the certain period.

In some example embodiment, the WAF fluctuation detector 523_1 checks the WAF value, which may be calculated in real time. Also, the WAF fluctuation detector 523_1 may detect whether the amount of change in the WAF value exceeds a certain threshold. If the WAF value suddenly increases significantly, it is determined that the power consumption by the memory device 530 is likely to exceed the desired or maximum power. In this case, the performance controller 523 may adjust the performance of the write operation in real time. For example, when a large increase in the WAF value is detected, real-time performance adjustment may be performed without delaying performance adjustment until the cycle ends, in order to achieve performance adjustment based on the host WAF. For example, with respect to the mapping size ratio used for the performance adjustment, the value calculated from a previous cycle may be applied, or the average mapping size ratio in a section from the start of each cycle to a point when a large increase in the WAF value is detected may be applied.

FIG. 13 is a graph showing a case in which the power consumption is maintained constant according to the example embodiments of FIG. 12. In the graph, the vertical axis on the left may represent write/read performance, the vertical axis on the right may represent power consumption, and the horizontal axis may represent time.

As shown in FIG. 13, the memory system according to the inventive concepts may maintain power consumption within a certain range without exceeding the desired or maximum power. For example, if the request unit from the host is 16 KB, the memory system may execute the write command with relatively high performance. On the other hand, when the request unit from the host is as small as 8 KB, the performance of the write operation may be lowered based on the calculation processing in the example embodiments. Accordingly, despite changes in the request unit from the host, the power consumed by the memory device may be more stably maintained within a certain range.

Figure 14A:
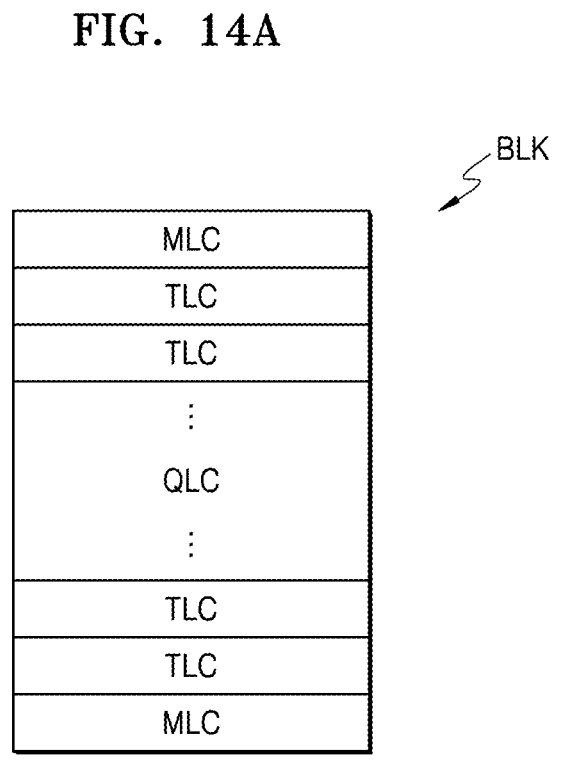
Figure 14B:
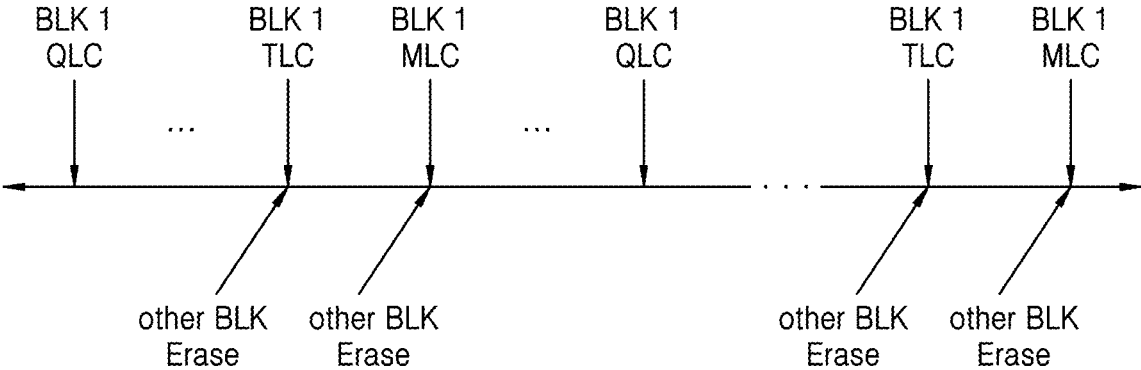
Figure 15:
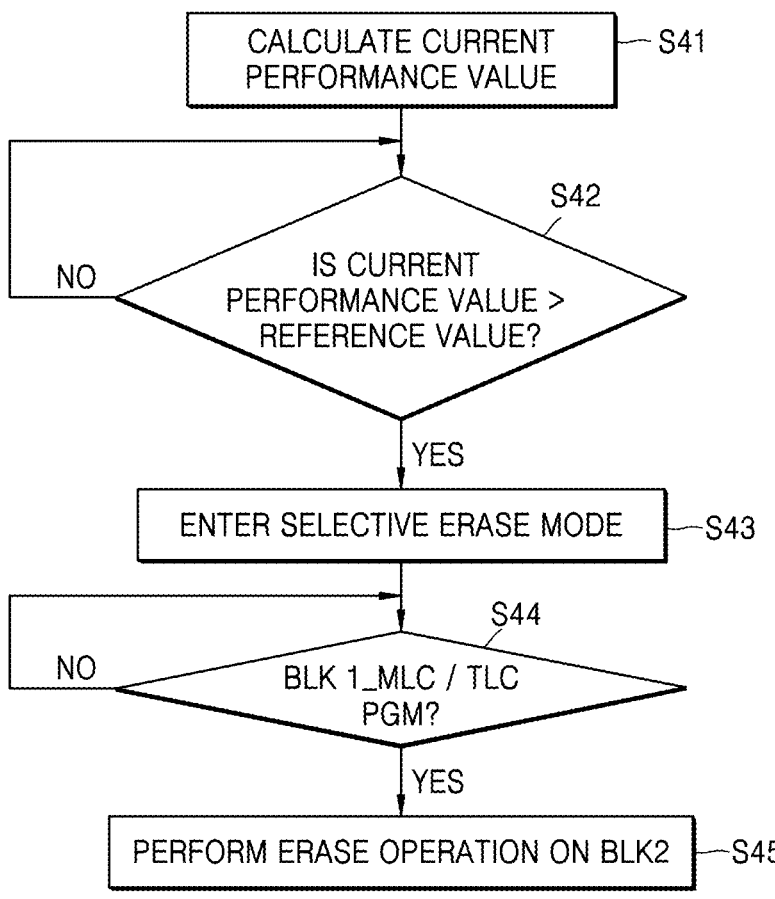

FIGS. 14A and 14B and FIG. 15 are diagrams showing an example of operating a memory system according to some example embodiments. FIGS. 14A and 14B and FIG. 15 illustrate a case in which power consumption is kept constant when performing a write operation and an erase operation.

Referring to FIG. 14A, a block of a memory device may include a plurality of pages. For example, the block may have the 3-dimensional structure described with reference to FIGS. 6 to 8. Among the plurality of pages, one or more pages located in an edge region (e.g., upper and lower regions) of the block may have properties relatively lower than properties of pages located in the center region. Also, a relatively small number of bits of data may be programmed into each memory cell of the page located in the edge region. An example of FIG. 14A illustrates a case in which the memory cells of the page located in the edge region include multi-level cells MLC that store 2 bits of data or triple level cells TLC that store 3 bits of data. For example, the memory cells of a page located in the center region includes quad level cells QLC that store 4 bits of data.

In writing data, relatively less power may be consumed when programming data in the multi-level cells MLC or the triple level cells TLC, compared to when programming data in the quad level cells QLC. Also, when performing power management according to the example embodiments, the erase operation that consumes relatively large power may be performed in synchronization with the write operation on the multi-level cells MLC or the triple level cells TLC. That is, the timing of the erase operation that consumes relatively large power is managed, and thus, the power consumed by the memory device or the memory system may be managed so as not to exceed the desired or maximum power.

Referring to FIG. 14B, a case is illustrated in which, while the write operation is performed on a first block, the erase operation is performed on at least one other block. For example, when a program is performed on a page located in the center region of a first block BLK 1, the erase operation on at least one other block may be prohibited at the timing of executing the corresponding program. On the other hand, when a program is performed on a page located in the edge region of the first block BLK 1, the erase operation on at least one other block may be performed at the timing of executing the corresponding program.

FIG. 15 illustrates a case in which the erase operation is performed or prohibited based on the calculated current performance value in the example embodiments shown in FIGS. 14A and 14B.

Referring to FIG. 15, the memory controller may calculate a current performance value (e.g., a target performance value) according to the above-described example embodiments (S41) and may determine whether the calculated current performance value exceeds a certain reference value (S42). If the current performance value exceeds a certain reference value, this situation may indicate that the power consumed by the memory device or the memory system is relatively high. When the current performance value exceeds a certain reference value, the memory system may enter a selective erase mode (S43).

As the memory system enters the selective erase mode, the memory controller may check the program type of the block on which the current write operation is performed when performing the erase operation on at least one block. For example, when the write operation is performed on the pages of the first block BLK 1, it may be determined whether the write operation on the pages of the first block BLK 1 relates to an MLC program or a TLC program (S44). If the MLC program or TLC program is performed as the page on which the write operation is performed corresponds to a page located in the edge region of the first block BLK 1, the erase operation may be performed on at least one other block (e.g., a second block BLK 2) (S45), and accordingly, a free block may be secured.

According to some example embodiments, the performance value is calculated periodically or in real time, and if the calculated performance value exceeds a certain reference value, the memory system may enter the selective erase mode. Accordingly, cases in which power consumption exceeds the desired or maximum power due to the erase operation may be reduced or prevented, and the power of the memory system may be managed more stably.

Figure 16:
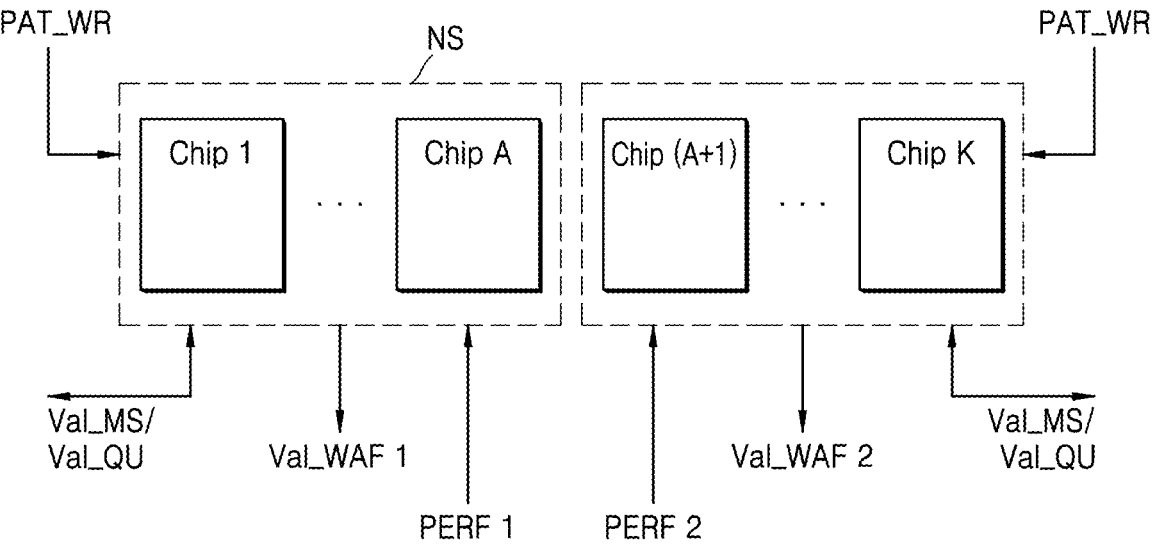
FIG. 16 is a block diagram showing a memory system according to some example embodiments.

FIG. 16 is a block diagram showing a memory system according to some example embodiments. FIG. 16 illustrates a case in which a memory device includes first to K-th memory chips (where K is an integer of 2 or more) as a plurality of memory chips, and different target performance values are set for the memory chips.

For example, when the memory system is used for a server, the memory device may be shared by a plurality of hosts, and the first to K-th memory chips provided in the memory device may be assigned to a plurality of users. For example, when an interface, such as non-volatile memory express (NVMe), is applied, a namespace NS including one or more memory chips may be defined. Also, each user may access the memory chips in the namespace assigned to the user.

According to some example embodiments, performance control of the WAF value calculation and the write operation may be performed in various units. For example, this performance control may be performed in a unit of the memory chip or in a unit of the namespace. Also, assuming that the performance of the write operation is adjusted in a unit of the namespace, the target performance value may be calculated using different information and values for each namespace, and the performance of the write operation may be adjusted based on this calculation.

For example, when the request unit from the host is used to calculate the target performance value according to the above-described example embodiments, request unit values Val_QU may be different from each other for hosts, and mapping size values Val_MS may be the same or different from each other for memory chips. In addition, the characteristics of accessing the memory devices may be different from each other for each user. For example, write patterns PAT_WR for the memory device may be different from each other. For example, depending on the write patterns PAT_WR of a specific user, there may be differences in the frequency of copying data to other pages and the frequency of occurrence of invalid data. Also, information that triggers garbage collection or the like, which causes a large workload, may differ from each other depending on the write patterns PAT_WR for each user.

In the example embodiments, certain regions may be defined for the memory chips provided in the memory device, and the WAF value calculation and the performance adjustment may be performed for each of the regions. An example of FIG. 16 illustrates a case in which a first WAF value Val_WAF 1 is calculated for one namespace and a second WAF value Val_WAF 2 is calculated for another namespace. The first WAF value Val_WAF 1 and the second WAF value Val_WAF 2 may be calculated differently. Also, write performance PERF 1 of one namespace and write performance PERF 2 of another namespace may be set differently based on calculating the WAF value.

Also, in some example embodiments, the desired or maximum power that may be consumed by the memory system may correspond to a value calculated for all memory chips in the memory device, and the desired or maximum power may be allocated to certain regions equally or at a certain ratio. When applying the equation for calculating the target performance value according to the above-described example embodiments, the reference performance value (or the desired or maximum performance value) may include a value set based on the power allocated to each of regions.

Figure 17:
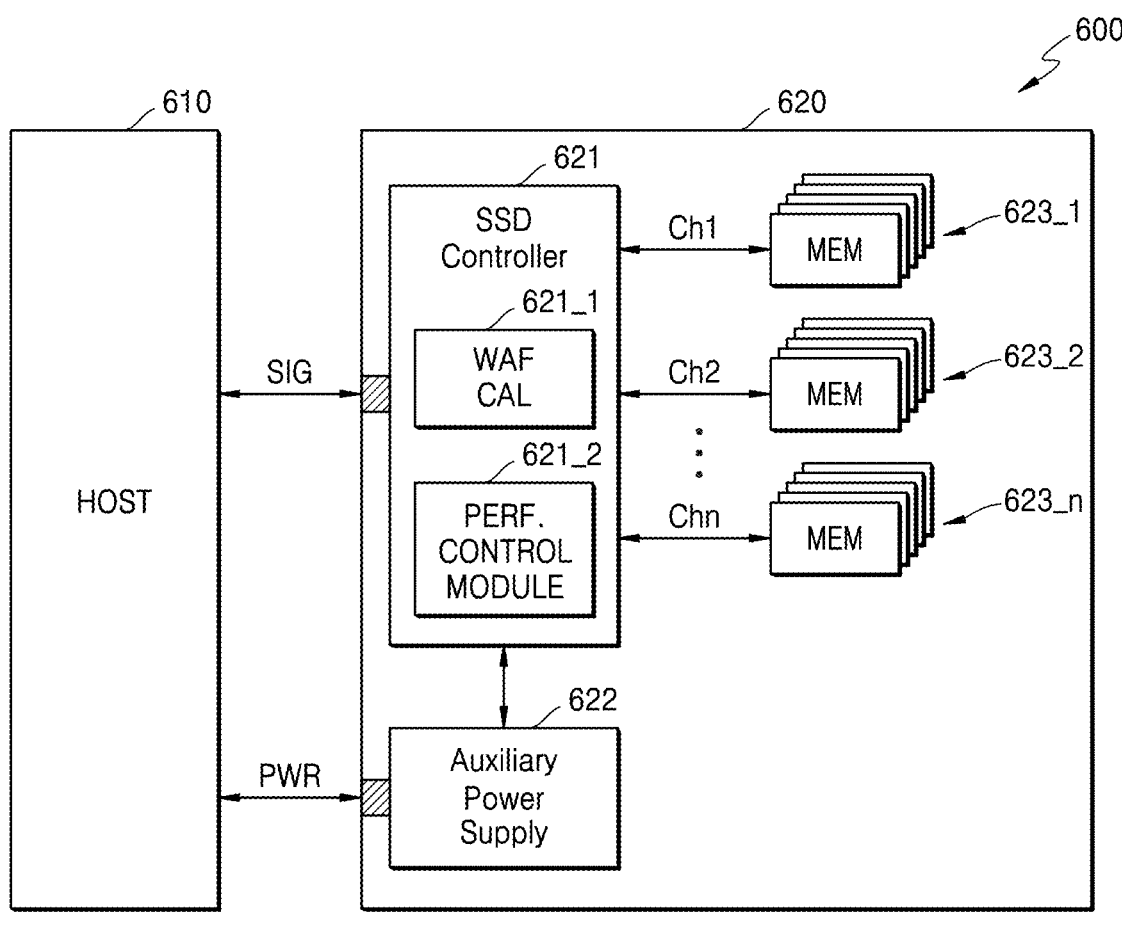
FIG. 17 is a block diagram showing an example in which a memory system according to some example embodiments is applied to a solid state drive (SSD) system.

FIG. 17 is a block diagram showing an example in which a memory system according to some example embodiments is applied to an SSD system 600.

Referring to FIG. 17, the SSD system 600 may include a host 610 and an SSD 620. The SSD 620 may exchange a signal SIG with the host 610 via a signal connector and receive power PWR via a power connector. The SSD 620 may include an SSD controller 621, an auxiliary power supply 622, and non-volatile memory devices 623_1 to 623_n. The non-volatile memory devices 623_1 to 623_n may include NAND flash memory or the like. Here, the SSD 620 may be provided using the example embodiments described above with reference to FIGS. 1 to 16.

For example, the SSD controller 621 provided in the SSD 620 may include a WAF calculator 621_1 and a performance control module 621_2 according to the above-described example embodiments. Also, the SSD controller 621 and the non-volatile memory devices 623_1 to 623_n may communicate with each other via a plurality of channels Ch1 to Chn. According to some example embodiments, the performance, such as write operations for the non-volatile memory devices 623_1 to 623_n, may be adjusted, and the power consumed by the non-volatile memory devices 623_1 to 623_n may be more stably managed. In addition, the WAF calculator 621_1 may calculate a WAF value on the basis of data provided from the host 610 and data written to the non-volatile memory devices 623_1 to 623_n. Also, the performance control module 621_2 may control the performance of the non-volatile memory devices 623_1 to 623_n through calculation processing using various pieces of information and values, including the WAF values.

Any or all of the elements described with reference to the figures may communicate with any or all other elements described with reference to the respective figures. For example, any element may engage in one-way and/or two-way and/or broadcast communication with any or all other elements, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While the inventive concepts have been particularly shown and described with reference to some example embodiments thereof, it will be understood that various changes in form and details may be made therein without departing from the spirit and scope of the following claims.

What is claimed is:

1. A memory controller configured to communicate with a host and control a write operation of a memory device, the memory controller comprising:
   a write amplification factor (WAF) calculator configured to calculate a WAF value relating to a ratio of an amount of data written to the memory device to an amount of write data provided from the host;
   a performance controller configured to adjust performance of the write operation such that the performance of the write operation decreases, compared to a performance value, as the calculated WAF value increases, the performance controller configured to thereby control the memory device to consume power within a power range; and
   a command processor configured to control execution of write commands for performing the write operation, based on control by the performance controller,
   wherein the performance controller is configured to reduce the performance of the write operation, compared to the performance value, in inverse proportion to the increase in the calculated WAF value.

2. The memory controller of claim 1, wherein the command processor is configured to reduce a number of write commands executed per a time period based on the control by the performance controller.

3. The memory controller of claim 1, wherein the performance value corresponds to a reference performance value applicable to the write operation, and the performance controller calculates a value obtained by dividing the reference performance value by the WAF value as a target performance value of the write operation,
   wherein, as the WAF value becomes greater than 1, the target performance value has a value less than the reference performance value.

4. The memory controller of claim 1, wherein the memory controller is configured to control a read operation of the memory device, and the command processor is configured to control execution of read commands,
   wherein the performance controller is configured to adjust performance of the write operation so that the performance of the write operation decreases in response to an increase in the performance of the read operation.

5. The memory controller of claim 1, wherein the memory controller is configured to receive write data according to a request unit from the host and program data into the memory device based on a mapping size,
   wherein the performance controller is configured to adjust performance of the write operation such that the performance of the write operation decreases in response to a decrease in a size of the request unit.

6. The memory controller of claim 5, wherein the mapping size has a fixed value, and
   the performance controller is configured to adjust the performance of the write operation such that the performance of the write operation is reduced compared to the performance value in proportion to the decrease in the size of the request unit and in inverse proportion to the increase in the calculated WAF value.

7. The memory controller of claim 5, wherein the memory controller is configured to communicate with a plurality of hosts, and the size of the request unit corresponds to an average value of request units of the plurality of hosts.

8. The memory controller of claim 1, wherein the memory controller is configured to control the write operation and an erase operation of a plurality of blocks provided in the memory device, and each of the blocks includes an edge region including a first number of bits of data programmed for each memory cell and a center region including a second number of bits of data programmed for each memory cell, the first number of bits being smaller than the second number of bits, wherein the memory controller is configured to control the erase operation such that, in response to a page in the center region of a first block among the plurality of blocks being programmed, the erase operation of at least one other block is blocked, and in response to a page in the edge region of the first block is programmed, the erase operation of the at least one other block is performed.

9. The memory controller of claim 8, wherein the memory controller is configured to control the erase operation such that the erase operation is selectively performed in response to the calculated WAF value exceeding a reference value.

10. A method of operating a memory controller that controls a memory operation of a memory device, the method comprising:

calculating a write amplification factor (WAF) value relating to a ratio of an amount of data written to the memory device to an amount of write data provided from a host;

reducing performance of the memory operation, compared to a performance value for the memory operation, in inverse proportion to an increase in the calculated WAF value; and adjusting execution scheduling of commands for performing the memory operation according to the reduced performance of the memory operation, wherein at least one of a data write bandwidth in a write operation or a data read bandwidth in a read operation is reduced according to the adjusted execution scheduling of commands.

11. The method of claim 10, wherein the data write bandwidth is reduced by reducing an execution frequency of a write command among the commands according to the reduced performance of the memory operation.

12. The method of claim 10, wherein the data write bandwidth is reduced with the data read bandwidth by reducing execution frequencies of a write command and a read command according to the reduced performance of the memory operation.

13. The method of claim 10, wherein the performance value corresponds to a reference performance value applicable to the write operation, and the reducing of the performance of the memory operation includes adjusting the performance of the write operation by calculating a value obtained by dividing the reference performance value by the WAF value as a target performance value of the write operation, wherein, as the WAF value becomes greater than 1, the target performance value has a value less than the reference performance value.

14. The method of claim 13, wherein the reducing of the performance of the memory operation further includes reducing the performance of the write operation in response to an increase in performance of the read operation.

15. The method of claim 14, wherein the reducing of the performance of the memory operation includes performing calculation using information relating to the reference performance value, the calculated WAF value, information indicating the performance of the read operation, and at least one coefficient.

16. The method of claim 13, wherein the memory controller receives write data according to a request unit from the host and programs data into the memory device based on a mapping size, and the reducing of the performance of the memory operation further includes adjusting the performance of the memory operation such that the performance of the write operation is reduced in response to a decrease in a size of the request unit.

17. A memory system comprising:

a memory device; and a memory controller configured to communicate with a host, control a write operation of the memory device, and including a performance controller configured to control the performance of the write operation based on a write amplification factor (WAF) value relating to a ratio of an amount of data written to the memory device to an amount of write data provided from the host, wherein the memory controller is configured to communicate write data as performance to the memory device according to a first write bandwidth based on the WAF value being calculated as a first value, and wherein the memory controller is configured to communicate write data as performance to the memory device according to a second write bandwidth less than the first write bandwidth based on the WAF value being calculated as a second value greater than the first value.

18. The memory system of claim 17, wherein the WAF value has a value of 1 or more, a target performance value is calculated based on a result of dividing a maximum performance value applicable to the write operation by the WAF value, and the performance of the write operation is adjusted to correspond to the target performance value.

19. The memory system of claim 17, wherein the memory device includes a plurality of blocks, and each of the blocks includes an edge region including a first number of bits of data programmed for each memory cell and a center region including a second number of bits of data programmed for each memory cell, the second number of bits of data being larger the first number of bits of data, wherein the memory controller is configured to control an erase operation such that, in response to a page in the center region of a first block among the plurality of blocks being programmed, the erase operation of at least one other block is blocked, and in response to a page in the edge region of the first block being programmed, the erase operation of the at least one other block is performed.

\*  \*  \*  \*  \*